United States Patent
Iwamoto et al.

(10) Patent No.: US 6,863,442 B2
(45) Date of Patent: Mar. 8, 2005

(54) BEARING WITH ROTATIONAL SENSOR

(75) Inventors: Kenichi Iwamoto, Iwata (JP); Takashi Koike, Iwata (JP); Shouichi Hioki, Kuwana (JP); Hiroyoshi Ito, Kuwana (JP)

(73) Assignee: NTN Corporation, Osaka (JP)

( * ) Notice: Subject to any disclaimer, the term of this patent is extended or adjusted under 35 U.S.C. 154(b) by 72 days.

(21) Appl. No.: 10/340,612

(22) Filed: Jan. 13, 2003

(65) Prior Publication Data
US 2003/0142891 A1 Jul. 31, 2003

(30) Foreign Application Priority Data

Jan. 31, 2002 (JP) ........................................ 2002-023165

(51) Int. Cl.[7] .............................................. F16C 19/08
(52) U.S. Cl. ...................................................... 384/448
(58) Field of Search ................................ 384/448, 446, 384/544; 324/174, 173

(56) References Cited

U.S. PATENT DOCUMENTS

| 4,915,512 | A | * | 4/1990 | Hilby et al. | ................. | 384/448 |
| 6,559,633 | B1 | * | 5/2003 | Nachtigal et al. | ........... | 324/174 |
| 6,637,754 | B1 | * | 10/2003 | Ohtsuki et al. | ............. | 384/448 |

* cited by examiner

*Primary Examiner*—Lenard A Footland
(74) *Attorney, Agent, or Firm*—McDermott Will & Emery LLP

(57) ABSTRACT

A bearing with a rotational sensor has a magnetic sensor includes a race including an inner ring and an outer ring. Between the inner ring and the outer ring, a magnetic sensor holding member having an annular portion is arranged. The annular portion of the magnetic sensor holding member is provided with a holding portion holding the magnetic sensor. The magnetic sensor is held in the holding portion of the magnetic sensor holding member and is arranged between the outer circumferential surface of the inner ring and the inner circumferential surface of the outer ring. Therefore the bearing with a rotational sensor that is improved to allow easy assembly and compactness can be obtained.

8 Claims, 5 Drawing Sheets

BEARING WITH ROTATIONAL SENSOR

BACKGROUND OF THE INVENTION

1. Field of the Invention

The present invention generally relates to a bearing with a rotational sensor, and more particularly to a bearing with a rotational sensor which detects an angle of rotation for motors, engines or the like.

2. Description of the Background Art

FIG. 9 is a cross sectional view of a conventional bearing with a rotational sensor.

The conventional bearing with a rotational sensor has a rotational sensor built into a rolling bearing in view of the advantages of its compactness and easiness of assembly.

A rolling bearing 1 supports the loads exerted on a rotating shaft 6. Rolling bearing 1 is formed of an inner ring of a rotary ring 11, an outer ring of a stationary ring 9, and a rolling element 10 formed of a steel ball or a roller. A magnetized rubber encoder 2 is fixed on rotary ring 11 of rolling bearing 1. A magnetic sensor 12, for example, a hall element or the like is arranged on stationary ring 9. Magnetic sensor 12 is inserted and thereafter molded in a resin case 5 with resin. Resin case 5 is fixed on stationary ring 9 with a metal case 4 interposed.

A rotational pulse signal, a direction of rotation, and the like can be obtained by building magnetic sensor 12 serving as a rotational sensor into rolling bearing 1 in this way.

The configuration of the conventional bearing with a rotational sensor, however, has a disadvantage in that it increases the cost and is hardly reduced in size since a member formed using a die or the like is used to fix magnetic sensor 12 on stationary ring 9.

SUMMARY OF THE INVENTION

The present invention is made to solve the aforementioned problems and is aimed to provide a cost-effective bearing with a rotational sensor by simplifying a member for fixing a magnetic sensor and by facilitating its assembly.

A bearing with a rotational sensor in accordance with the present invention has a magnetic sensor and includes a race including an inner ring and an outer ring. Between the inner ring and the outer ring, a magnetic sensor holding member having an annular portion is arranged. The annular portion of the magnetic sensor holding member is provided with a holding portion holding the magnetic sensor. The magnetic sensor is held in the holding portion of the magnetic sensor holding member and is arranged between the outer circumferential surface of the inner ring and the inner circumferential surface of the outer ring.

In accordance with a preferred embodiment of the present invention, the holding portion includes a tubular protrusion formed to pass through the surface of the annular portion. The magnetic sensor is held in the holding portion by caulking the tubular protrusion with a portion of a magnetic sensor unit being inserted in the tubular protrusion.

In accordance with another embodiment of the present invention, the annular portion is engaged in a groove provided in the inner ring or the outer ring.

In accordance with a further embodiment of the present invention, the groove provided in the outer ring includes a seal groove for the inner ring or for the outer ring.

In accordance with a yet further embodiment of the present invention, the annular portion has a notch at a part of the circumference of the annular portion.

In accordance with a still further embodiment of the present invention, the outer circumferential portion of the annular portion has its rim bent.

In accordance with other embodiment of the present invention, the outer circumferential portion of the annular portion is provided with a protrusion preventing rotation of the magnetic sensor holding member.

In accordance with a still further embodiment of the present invention, the inner circumference of the annular portion is provided with a seal member for sealing the bearing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
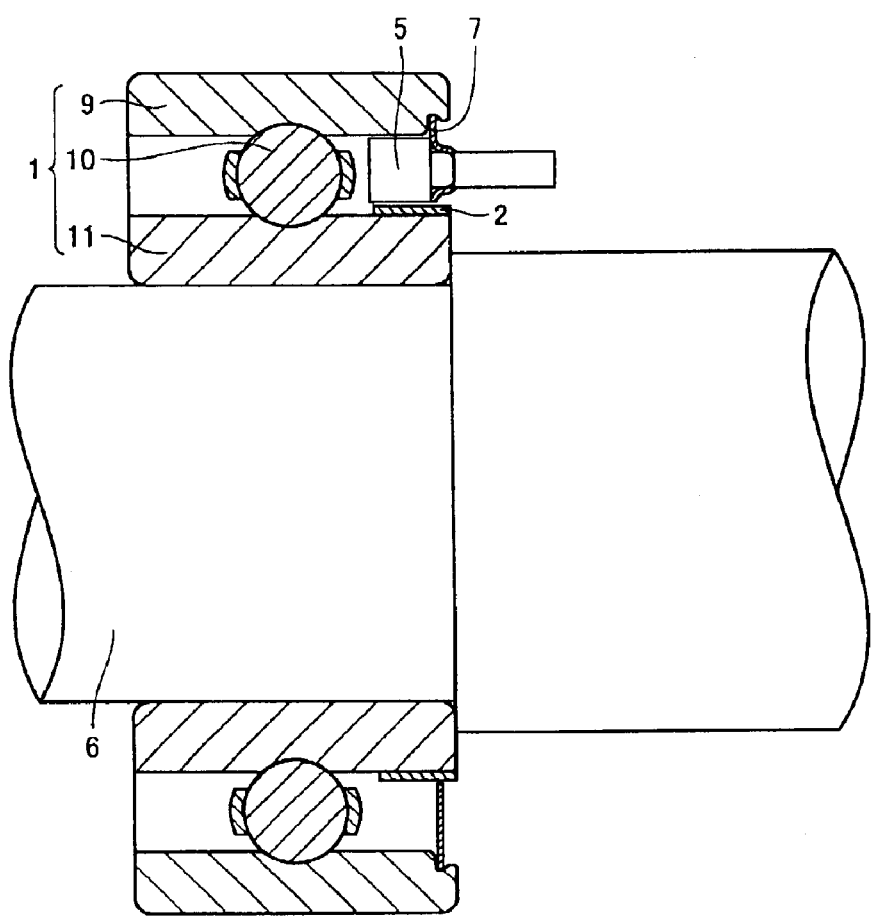
FIG. 1 is a cross sectional view of a bearing with a rotational sensor in accordance with a first embodiment.

In the following, the embodiments of the present invention will now be described with reference to the figures. In the drawings described below, the same or corresponding parts will be denoted with the same reference characters.

(First Embodiment)

Figure 2:
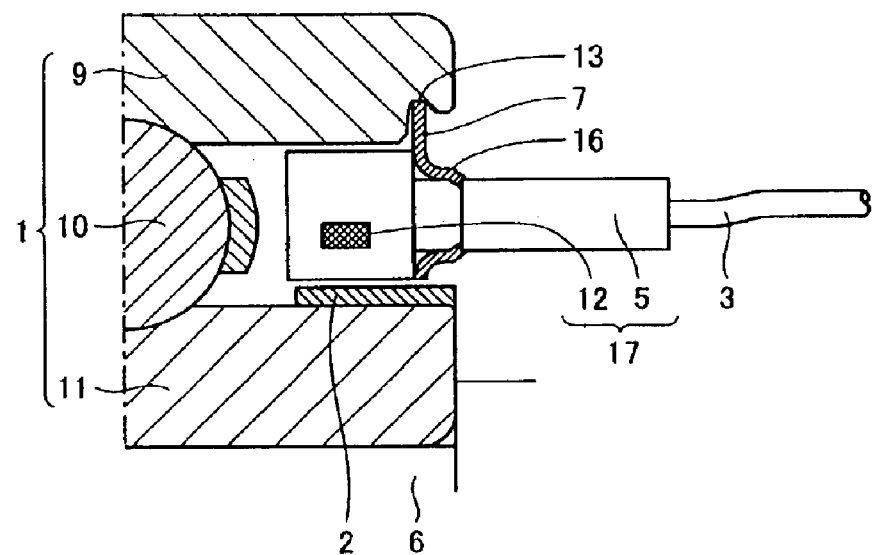
FIG. 2 is a partially enlarged view of the bearing with a rotational sensor shown in FIG. 1.

Referring to FIGS. 1 and 2, a rolling bearing 1 includes a stationary ring (outer ring) 9, a rotary ring (inner ring) 11, and a rolling element (steel ball) 10. Stationary ring 9 and rotary ring 11 are collectively referred to as a race. Rolling bearing 1 supports the loads exerted on a rotating shaft 6. A magnetic sensor unit 17 is formed by accommodating a magnetic sensor 12 in a resin case 5. Magnetic sensor 12 is connected to a cable 3. Magnetic sensor unit 17 is fixed to stationary ring 9 through a magnetic sensor holding member 7 having an annular portion, for example, a snap ring or the like. Magnetic sensor holding member 7 may be formed of resin or the like other than metal. Magnetic sensor holding member 7 will now be described in detail.

Figure 3:
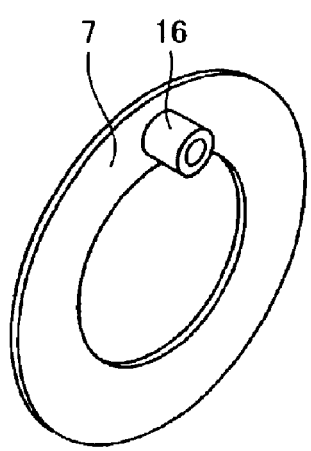
FIG. 3 is a view showing a first specific example of a magnetic sensor holding member used in the present invention.

Referring to FIG. 3, an annular protrusion 16 is formed in at least one point on the annular portion of magnetic sensor holding member 7 by plastic working or the like. Protrusion 16 may be formed by presswork or burring.

Figure 4:
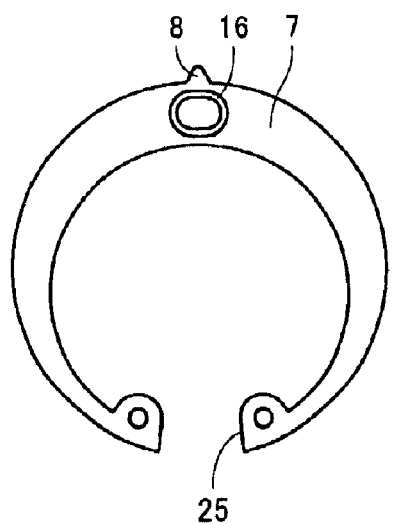
FIG. 4 is a view showing a second specific example of the magnetic sensor holding member used in the present invention.

Referring to FIG. 4, a snap ring is shown as an exemplary magnetic sensor holding member 7. In this specific example, an elliptical protrusion 16 is formed in place of an annular protrusion so as to facilitate accommodation of an flat magnetic sensor device. Protrusion portion 8 for preventing rotation of magnetic sensor holding member 7 is provided, as anti-rotation means, radially on the side opposite an opening portion 25 of the snap ring and in the vicinity of elliptical protrusion portion 16. The configuration in this manner ensures that magnetic sensor unit 17 is prevented from moving due to an external vibration or the like.

Figure 5:
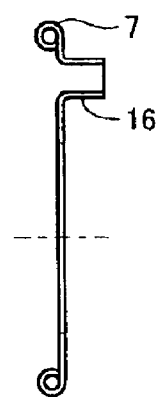
FIG. 5 is a view showing a third specific example of the magnetic sensor holding member used in the present invention.

Referring to FIG. 5, magnetic sensor holding member 7 can be fixed even more firmly by bending the rim of the outer diameter portion of the annular portion of magnetic sensor holding member to be shaped like a coil.

It is noted that the shape of the outer diameter portion of the magnetic sensor holding member is not limited the description above. Furthermore, the holding portion that holds magnetic sensor unit 17 may not be limited to the annular or elliptical protrusion 16 as described above as long as it includes a tubular protrusion formed to pass through the surface of the annular portion of magnetic sensor holding member 7.

Figure 6:
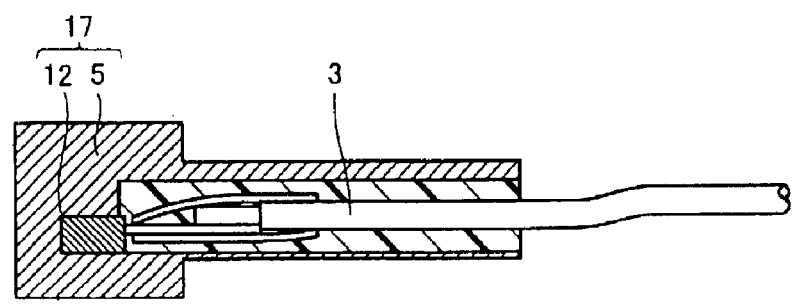
FIG. 6 is a view showing a magnetic sensor unit secured.

Referring to FIG. 6, in magnetic sensor unit 17, magnetic sensor 12 having cable 3 attached is secured by resin molding in resin case 5 having a cylindrical or elliptical cross section. Although cable 3 can be joined to magnetic sensor 12 through a printed circuit other than by soldering, the present invention is not limited thereto.

Returning to FIG. 2, magnetic sensor holding member 7 is fixed by caulking and securing tubular protrusion 16 with a portion of magnetic sensor unit 17 being inserted in tubular protrusion 16 formed to pass through the surface of magnetic sensor holding member 7, and thereafter by engaging the annular portion of magnetic sensor holding member 7 into a groove 13 (which is formed on the circumference) provided in stationary ring 9. This magnetic sensor holding member 7 is arranged between stationary ring 9 and rotary ring 11. Therefore magnetic sensor unit 17 is held in the holding portion of magnetic sensor holding member 7 and is arranged between the outer circumferential surface of the inner ring and the inner circumferential surface of the outer ring.

It is noted that a magnetic encoder 2 is fixed on the outer circumferential surface of rotary ring 11 to be opposed to magnetic sensor 12.

Furthermore, groove 13 may be a seal groove.

(Second Embodiment)

Figure 7:
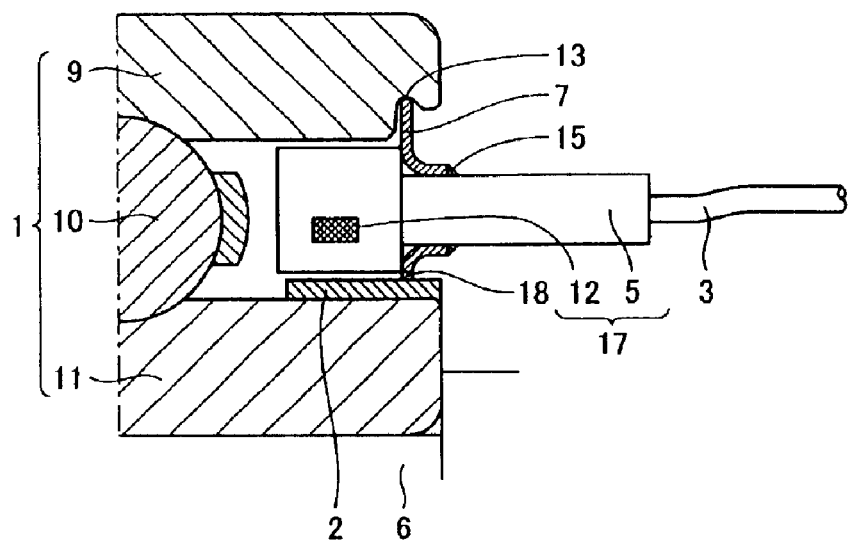
FIG. 7 is a cross sectional view of the bearing with a rotational sensor in accordance with a second embodiment.

The same or corresponding parts of the bearing with a rotational sensor shown in FIG. 7 will be denoted with the same reference numbers with the bearing with a rotational sensor shown in FIG. 1, and the description thereof will not be repeated.

In the bearing with a rotational sensor shown in FIG. 2, magnetic sensor holding member 7 and magnetic sensor unit 17 are fixed with each other by caulking, by way of example. In the present embodiment, referring to FIG. 7, magnetic sensor holding member 7 and magnetic sensor unit 17 are fixed with each other not by caulking but by welding or fusion 15.

It is noted that although in the embodiments above magnetic sensor holding member 7 and magnetic sensor unit 17 are illustrated as being fixed with each other by caulking or welding, they may be fixed using a screw or the like, and the present invention is not limited to the embodiments above.

In the present embodiment, referring to FIG. 7, seal 18 is applied on the inner circumferential portion and at that part of the annular portion of magnetic sensor holding member 7 which faces magnetic encoder 2. Since this seal can seal the bearing, it can prevent intrusion of foreign particles into the bearing.

(Third Embodiment)

While the stationary side on which the magnetic sensor or the like is fixed has been described in the embodiments described above, a rubber magnet or a plastic magnet can be used as magnetic encoder 2 to be fixed on rotary ring 11. The present invention, however, is not limited thereto, and a metal-base, such as Cu—Ni base or Mn—Al base magnet which can be further reduced in thickness can be used.

Figure 8:
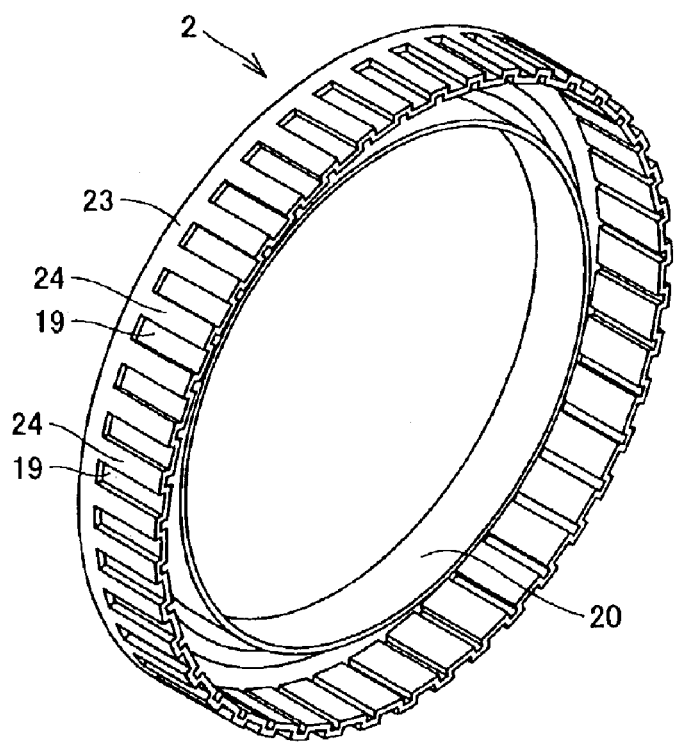
FIG. 8 is a perspective view of a magnetic material used in place of a magnetic encoder in a third embodiment.
Figure 9:
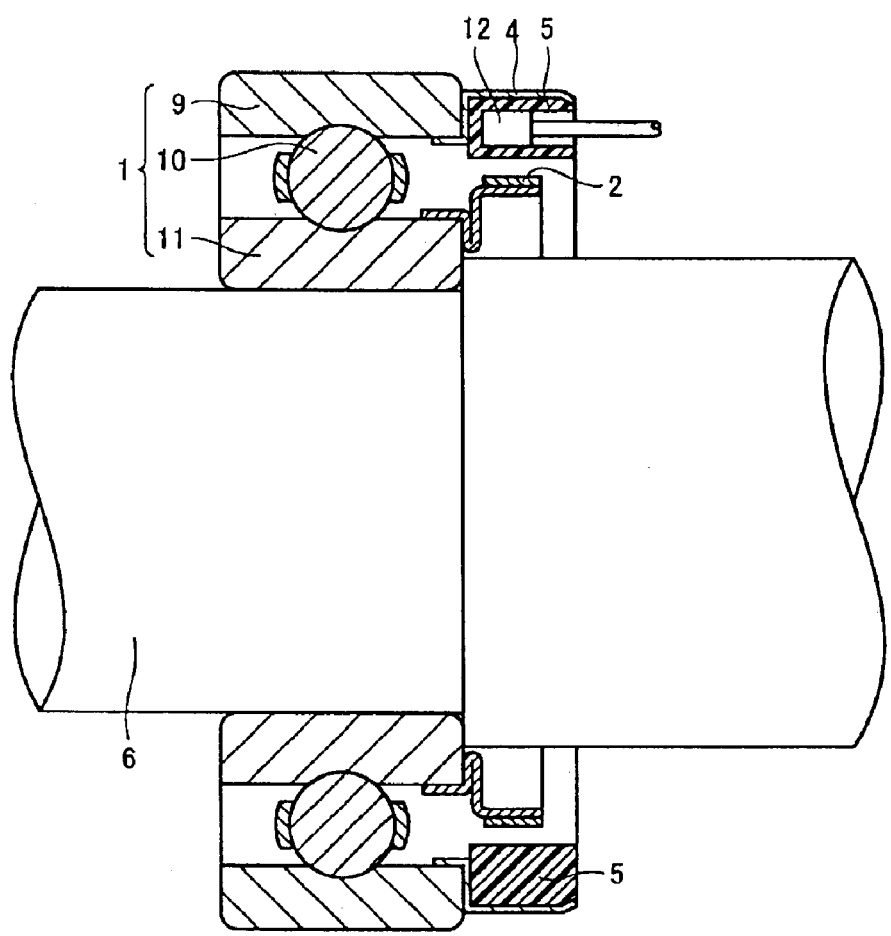
FIG. 9 is a cross sectional view of a conventional bearing with a rotational sensor.

In place of magnetic encoder 2, a magnetic material corrugated or flexed at right angle as shown in FIG. 8 may be used. The magnetic material may be formed, though not shown, by partially reducing the thickness thereof. It is noted in FIG. 8 a pulse ring 2 has a boss 20, a trough portion 19, a crest portion 24, and a rib 23.

The magnetic material shown in FIG. 8 has the border between crest portion 24 and trough portion 19 flexed at right angle and thus has an advantage in that a pulse accuracy is better than a corrugated shape. In these cases, a back magnet type is used in which a permanent magnet is arranged at the back of the magnetic sensor.

As described above, in accordance with the present invention, the magnetic sensor unit is fixed to the magnetic sensor holding member by caulking or the like and the magnetic sensor holding member is fixed using the circumferential groove in the stationary ring, resulting in that the advantages of easy assembly and compactness. In addition, since the magnetic sensor holding member which is a fixing portion for the magnetic sensor unit also functions as a seal, the number of components can advantageously be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bearing with a rotational sensor having a magnetic sensor, comprising:

a race including an inner ring and an outer ring;

a magnetic sensor holding member having an annular portion, arranged between said inner ring and said outer ring; and a holding portion provided on said annular portion of said magnetic sensor holding member for holding said magnetic sensor, wherein said holding portion includes a tubular protrusion formed to pass through a surface of said annular portion so that said magnetic sensor is held in said holding portion of said magnetic sensor holding member and is arranged between an outer circumferential surface of said inner ring and an inner circumferential surface of said outer ring.

2. A bearing with a rotational sensor having a magnetic sensor, comprising:

a race including an inner ring and an outer ring;

a magnetic sensor holding member having an annular portion, arranged between said inner ring and said outer ring; and a holding portion provided on said annular portion of said magnetic sensor holding member for holding said magnetic sensor, wherein said magnetic sensor is held in said holding portion of said magnetic sensor holding member and is arranged between an outer circumferential surface of said inner ring and an inner circumferential surface of said outer ring; and said holding portion includes a tubular protrusion formed to pass through a surface of said annular portion, and the tubular protrusion is caulked with a portion of a magnetic sensor unit being inserted in the tubular protrusion so that said magnetic sensor is held in said holding portion.

3. The bearing with a rotational sensor according to claim 1, wherein said annular portion is engaged in a groove provided in said inner ring or said outer ring.

4. The bearing with a rotational sensor according to claim 3, wherein said groove provided in said outer ring includes a seal groove for the inner ring or for the outer ring.

5. The bearing with a rotational sensor according to claim 1, wherein said annular portion has a notch at a part of the circumference of said annular portion.

6. The bearing with a rotational sensor according to claim 1, wherein an outer circumferential portion of said annular portion has its rim bent.

7. A bearing with a rotational sensor having a magnetic sensor, comprising:

a race including an inner ring and an outer ring;

a magnetic sensor holding member having an annular portion, arranged between said inner ring and said outer ring; and a holding portion provided on said annular portion of said magnetic sensor holding member for holding said magnetic sensor, wherein said magnetic sensor is held in said holding portion of said magnetic sensor holding member and is arranged between an outer circumferential surface of said inner ring and an inner circumferential surface of said outer ring; and an outer circumferential portion of said annular portion is provided with a protrusion preventing rotation of said magnetic sensor holding member.

8. The bearing with a rotational sensor according to claim 1, wherein an inner circumference of said annular portion is provided with a seal member for sealing the bearing.

* * * * *